(No Model.)
J. W. HULL.
COLLAR FOR ANIMALS.
No. 485,630.        Patented Nov. 8, 1892.
*Fig-1-*
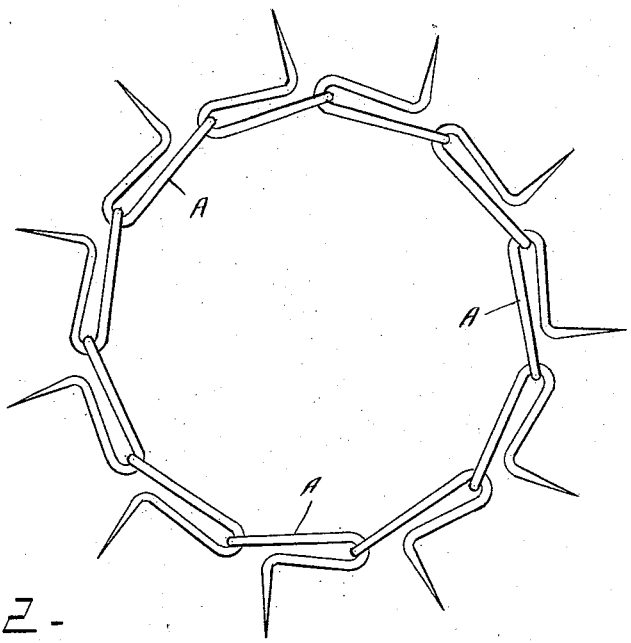
*Fig-2-*
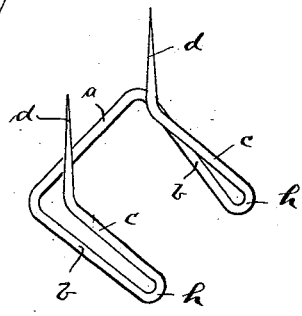
*Fig-3-*
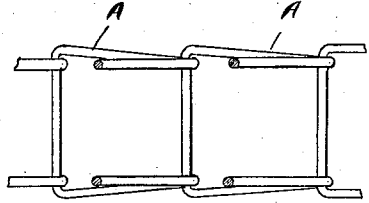
Witnesses:
Louis D. Thomason
W. S. Hauer
Inventor:
John W. Hull.
by Chas. J. Stockman
Associate Attorney

UNITED STATES PATENT OFFICE.

JOHN W. HULL, OF DUBLIN, INDIANA.

COLLAR FOR ANIMALS.

SPECIFICATION forming part of Letters Patent No. 485,630, dated November 8, 1892.

Application filed March 29, 1892. Serial No. 426,889. (No model.)

*To all whom it may concern:*

Be it known that I, JOHN W. HULL, a citizen of the United States, residing at Dublin, in the county of Wayne and State of Indiana, have invented certain new and useful Improvements in Collars for Protection of Sheep Against Dogs and Wolves; and I do hereby declare the following to be a full, clear, and exact description of the invention, such as will enable others skilled in the art to which it appertains to make and use the same.

My invention relates to that class of collars used on animals for defense and protection.

My invention consists of a series of links so formed as to connect with each other, forming a chain any link of which is detachable and each of said links terminating in a sharp-pointed section at right angles to the bar of the link.

In the drawings, Figure 1 is a side elevation of the collar. Fig. 2 is a perspective view of one of the links composing the collar. Fig. 3 is a top plan view showing the construction and connection of the links.

In Fig. 1, A represents an individual link of which the collar is composed.

In Fig. 2, $a$ is the end bar of the link; $b\,b$, side bars nearly parallel and at right angles to the end bar $a$. $c\,c$ are return-bars immediately above and parallel with bars $b\,b$ and terminate in vertical points $d\,d$, which are turned up at right angles. The side bars $b\,b$ terminate in loops $h\,h$, into which the bar $a$ of the succeeding link is secured. The distance between the loops $h\,h$ is less than the length of the bar $a$, which permits the bar $a$ to pass over the points $d\,d$ and pass along into the loops $h\,h$, and as successive links are connected a chain is formed of any desired length and coupled together, forming a collar of any desired size. By the addition of links small collars may be made larger and by taking out links large collars may be made smaller. The links are preferably formed of wire of suitable size and of proportions similar to those shown in the drawings. The peculiar form of the link and the manner of connecting them to each other renders it nearly impossible for the collar to become disconnected while in use.

Having thus fully described my said invention, what I claim as new, and desire to secure by Letters Patent, is—

The herein-described collar for the purpose specified, consisting of a series of links, each made of a single piece of metal bent to form an end bar $a$, slightly-converging side bars $b\,b$, loop portion $h$, return-bars $c\,c$ above said bars $b$, and the sharpened projections $d$, extending from the ends of said bars $c$ and at an angle thereto, said links being removably engaged with each other in substantially the manner described.

In testimony whereof I affix my signature in presence of two witnesses.

JOHN W. HULL.

Witnesses:
 JOHN A. GRIFFEY,
 AMOS D. SMITH.